(12) United States Patent
Graef et al.

(10) Patent No.: US 7,583,762 B2
(45) Date of Patent: Sep. 1, 2009

(54) REDUCED-COMPLEXITY MULTIPLE-INPUT, MULTIPLE-OUTPUT DETECTION

(75) Inventors: Nils Graef, Allentown, PA (US); Joachim S. Hammerschmidt, Mountain View, CA (US)

(73) Assignee: Agere Systems Inc., Allentown, PA (US)

( * ) Notice: Subject to any disclaimer, the term of this patent is extended or adjusted under 35 U.S.C. 154(b) by 809 days.

(21) Appl. No.: 10/990,910

(22) Filed: Nov. 17, 2004

(65) Prior Publication Data
US 2006/0104390 A1    May 18, 2006

(51) Int. Cl.
*H03D 1/00* (2006.01)
(52) U.S. Cl. .................................. 375/341; 375/340
(58) Field of Classification Search ................ 375/341
See application file for complete search history.

(56) References Cited

U.S. PATENT DOCUMENTS

| | | | | |
|---|---|---|---|---|
| 5,418,795 | A * | 5/1995 | Itakura et al. ............... | 714/746 |
| 5,636,251 | A | 6/1997 | Citta et al. ................... | 375/341 |
| 6,404,828 | B2 | 6/2002 | Kaewell, Jr. ................. | 375/341 |
| 7,065,147 | B2 | 6/2006 | Ophir et al. ................. | 375/265 |
| 7,161,994 | B2 | 1/2007 | Shah et al. ................... | 375/341 |
| 7,321,644 | B2 * | 1/2008 | Love et al. ................... | 375/341 |
| 2004/0071235 | A1 * | 4/2004 | Love et al. ................... | 375/341 |
| 2006/0150058 | A1 | 7/2006 | Wang et al. ................. | 714/755 |

OTHER PUBLICATIONS

Filippo et al."Simplified Soft-Output Demapper for Binary Interleaved COFDM with Application to HIPERLAN/2" Proc. IEEE Int. Conf. Commun. (ICC) Apr. 2002.*

* cited by examiner

*Primary Examiner*—Mohammad H Ghayour
*Assistant Examiner*—Leon Flores
(74) *Attorney, Agent, or Firm*—Mendelsohn, Drucker & Associates, P.C.; Kevin M. Drucker; Steve Mendelsohn

(57) ABSTRACT

A wireless receiver detects signals generated with a multiple-input, multiple-output (MIMO) transmitter. The receiver applies maximum-likelihood detection (MLD) for soft-output signal detection, where an MLD exhaustive search across all candidate vectors is performed recursively by computing and accumulating the differences between, for example, the Euclidean metrics of consecutive candidate tests. Difference terms used for the accumulation are also calculated recursively. An ordering of candidates, such as by a triangular-waveform shaped ordering, is employed such that only one candidate variable is changed between any two consecutive candidate evaluations, leading to a reduced set of computations.

27 Claims, 7 Drawing Sheets

REDUCED-COMPLEXITY MULTIPLE-INPUT, MULTIPLE-OUTPUT DETECTION

BACKGROUND OF THE INVENTION

1. Field of the Invention

The present invention relates to communication systems, and, in particular, to data detection employing a multiple-input, multiple-output demapper.

2. Description of the Related Art

Reliable and efficient transmission of information signals over imperfect communication channels is essential for wireless communication systems. One method of transmission is multiple-input, multiple-output (MIMO) transmission. For MIMO transmission, a transmitter sends separate signals on two or more transmit antennas, the separately transmitted signals are combined as they pass through the channel, and the receiver receives the combined signals on each of one or more receive antennas. The receiver detects and demodulates each of the transmitted signals and processes the received signals to extract the information.

One successful approach to achieving reliable transmission is multi-carrier modulation (MCM). MCM is a modulation technique that might employ several transmit antennas at the transmitter. The principle of MCM is to divide a communication channel into a number of sub-carriers (also called tones or bins), with each sub-carrier independently modulated. Information is modulated onto a tone by varying the tone's phase, amplitude, or both.

Orthogonal frequency division multiplexing (OFDM) is a form of MCM in which tone spacing is selected such that each tone is orthogonal to all other tones over the given symbol interval. OFDM wireless local area network (wireless LAN or WLAN) systems are typically designed to conform to either a contention-based wireless medium access standard such as IEEE 802.11 or a scheduled time-division duplex (TDD) wireless medium access standard such as European Telecommunications Standards Institute (ETSI) HIPERLAN/2. In a WLAN system conforming to a contention-based standard, OFDM stations compete for access to the wireless medium using "fair contention" medium-sharing mechanisms specified in the standard. In contrast, medium access in a scheduled TDD-conforming WLAN system is controlled by a single designated station, which schedules medium access for all other transceivers.

IEEE Standard 802.11 and its extensions 802.11a/b/g specify the physical layers and medium access control procedures for OFDM WLAN systems. For example, an 802.11a-compliant system operates in the 5-GHz radio-frequency band and provides data communication capabilities of 6, 9, 12, 18, 24, 36, 48, and 54 Mbit/s. The system uses 52 tones (numbered from −26 to 26, excluding 0) that are modulated using binary or quadrature phase shift keying (BPSK/QPSK), 16-quadrature amplitude modulation (16-QAM), or 64-QAM. In addition, the system employs forward error correction (convolutional) coding with a coding rate of 1/2, 2/3, or 3/4.

In a MIMO wireless transmission, the signals that simultaneously arrive at each receive antenna are a mix of the signals coming from each of the various transmit antennas. Therefore, typical single-antenna demodulation (e.g., soft-slicing) techniques are not applicable, and MIMO demodulators ("demappers") are employed instead. Generally, a MIMO demapper generates, based on the signals coming from the various receive antennas, "soft decisions" (or "soft bits") for all bits modulated onto carriers of each transmit antenna. These soft bits are further processed to generate final "hard decisions" for the encoded data bits, for example, in a transmitted packet. Due to the random mutual cross-talk of transmit streams in the wireless MIMO channel, MIMO demapping can exhibit irregular performance. However, the performance of subsequent processing steps at the receiver (e.g., decoding) depends heavily on the quality of these initial soft-bit estimates. Consequently, a maximum degree of reliability in the demapping process is desired. Prior art MIMO demappers either sacrifice reliability or are relatively complex to implement.

One group of prior art MIMO demappers employs Zero-Forcing (ZF) or Minimum Mean Squared Error (MMSE) techniques to separate the various transmit streams from one another at the receiver. Separation is accomplished by applying sets of pre-processing (combining) weights to the signals of the various receive antennas, one set per transmit stream. Then, each resulting signal stream is demapped using single antenna stream techniques.

While the approach of these MIMO demappers is relatively simple to implement, suppression of mutual cross-talk between the separated signal streams might lead to noise-enhancement. In noise-enhancement, the effective Signal-to-Noise Ratio (SNR) in the various reconstructed signal streams might be relatively low depending on the properties of the wireless channel, leading to significant degradation in the generation of soft bits.

Another group of prior art MIMO demappers employs maximum-likelihood detection (MLD). For MLD, a search is performed in which ideal receive signals are constructed based on candidate transmit signals and the (known) MIMO transmission channel. An error metric (such as the minimum squared Euclidean distance) between the actual receive signals and the various constructed ideal receive signals is used to find the best candidate for soft-bits of a particular separated signal stream. Variations of this method might be applied to each bit encoded in the signals under consideration, and the corresponding desired soft-bits extracted from the various Euclidean distance terms. In the so-called "exhaustive search" variation of MLD, all possible candidates are considered. Other methods, such as spherically constrained decoding, reduce the size of the search by testing only a certain subset of all possible candidates.

However, the complexity of the search process is typically prohibitive for high-data-rate systems. For the example of 2-dimensional MIMO modulation using 64-QAM, the receiver's MIMO demapper evaluates 4096 candidate metrics, and a brute-force computation of each metric includes approximately 20 multiplication operations and 20 additions. Moreover, for systems employing OFDM, the brute-force computation is performed for each OFDM subcarrier. While the number of candidate metrics may be reduced by, for example, spherically constrained decoding, a very complex process might be required in practice to identify the relevant candidates. Moreover, when the number of candidate metrics is reduced, ensuring that the true candidate is actually found is difficult. Another disadvantage is that the spherically constrained search is performed separately per soft bit.

SUMMARY OF THE INVENTION

In accordance with embodiments of the present invention, a wireless receiver detects signals coming from the multiple transmitters (or transmit antennas) of a multiple-input, multiple-output (MIMO) system. The receiver applies maximum-likelihood detection (MLD) for soft-output signal detection, where an MLD exhaustive search across all candidate vectors is performed recursively by computing and accumulating the differences between, for example, the Euclidean metrics of consecutive candidate tests. Difference terms used for the accumulation are also calculated recursively. An ordering of candidates, such as by a triangular-shaped (waveform) ordering, is employed such that only one candidate variable is changed between any two consecutive candidate evaluations, leading to a reduced set of computations.

In accordance with an exemplary embodiment of the present invention, a data pattern is detected from a plurality of received signals. A sequence is provided of scan values derived from a sequence of count values, each scan value selecting one of a set of candidates in a varying pattern. For each of the sequence of count values, a difference term between a current metric value and a previous metric value is generated based on a set of coefficients for a received symbol. For each of a sequence of count values, the difference term is combined with one or more previous difference terms to provide one of a set of metric values. Based on the set of metric values corresponding to the sequence of scan values, soft-output values corresponding to the data pattern are generated.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
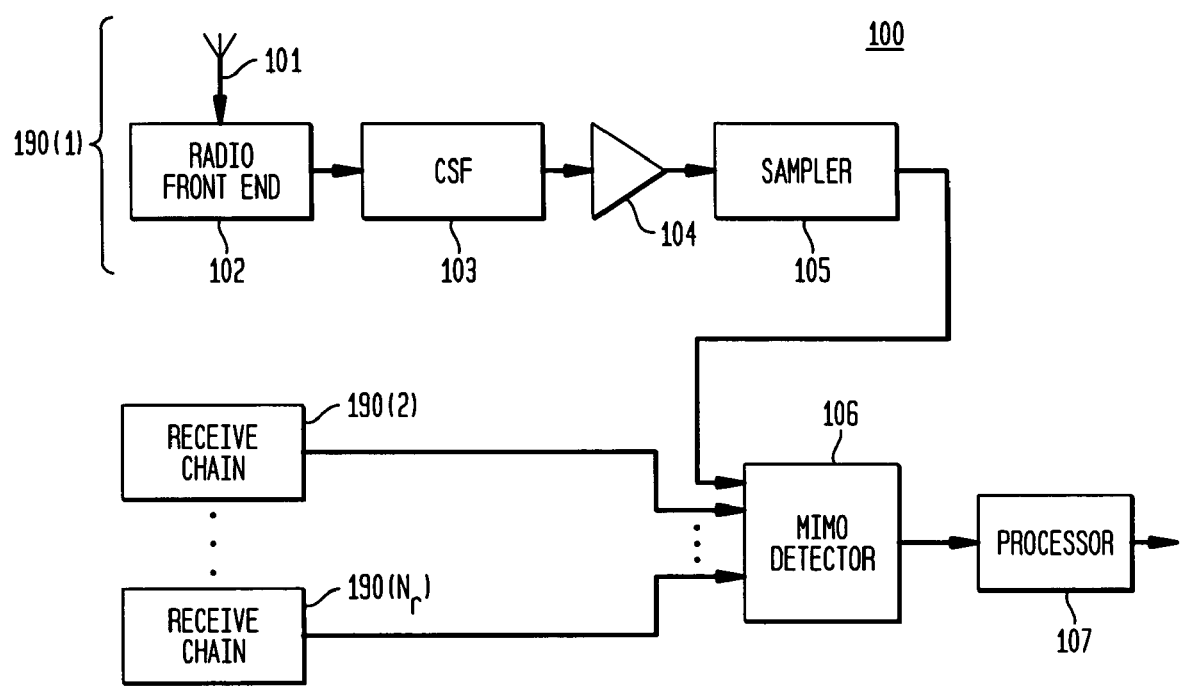
FIG. 1 shows a multiple-input, multiple-output (MIMO) receiver operating in accordance with exemplary embodiments of the present invention.

FIG. 1 shows a multiple-input, multiple-output (MIMO) receiver 100 operating in accordance with exemplary embodiments of the present invention. Receiver 100 comprises $N_r$ receive chains 190(1) through 190(Nr), where Nr is a positive. Typically, a MIMO receiver comprises two or more receive chains, where each receive chain might operate in a similar manner.

Receive chain 190(1) comprises antenna 101, radio front end (RFE) 102, channel selection filter (CSF) 103, programmable gain amplifier (PGA) 104, and sampler 105. Antenna 101 detects a signal from, for example, a wireless communication channel, where the signal might comprise two or more antenna signals generated by a MIMO transmitter. RFE 102 receives the signal from antenna 101, band filters and gain adjusts the antenna signal, and demodulates the antenna signal to base-band (BB) or near-BB.

CSF 103 filters the signal from RFE 102 so as to pass the desired information channel. For example, CSF 103 might be configured to operate for a WLAN according to the IEEE 802.11a/g standards for orthogonal frequency division multiplex (OFDM). For such configuration, CSF 103 has a bandwidth of approximately 20 MHz. PGA 104 adjusts the signal from CSF 103 to be within the range supported by sampler 105. Sampler 105 periodically time-samples the signal from PGA 104.

The outputs of all Nr receive chains 109(1) through 109(Nr) are monitored by MIMO detector 106 to detect the data from the received signal. The signal from detectors 106 is applied to processor 107 for subsequent processing and decoding. While processor 107 is shown in FIG. 1 as a single element, as would be apparent to one skilled in the art, the various processing of detected (e.g., encoded) data from MIMO detector 106 might be accomplished with two or more different processors.

Figure 2:
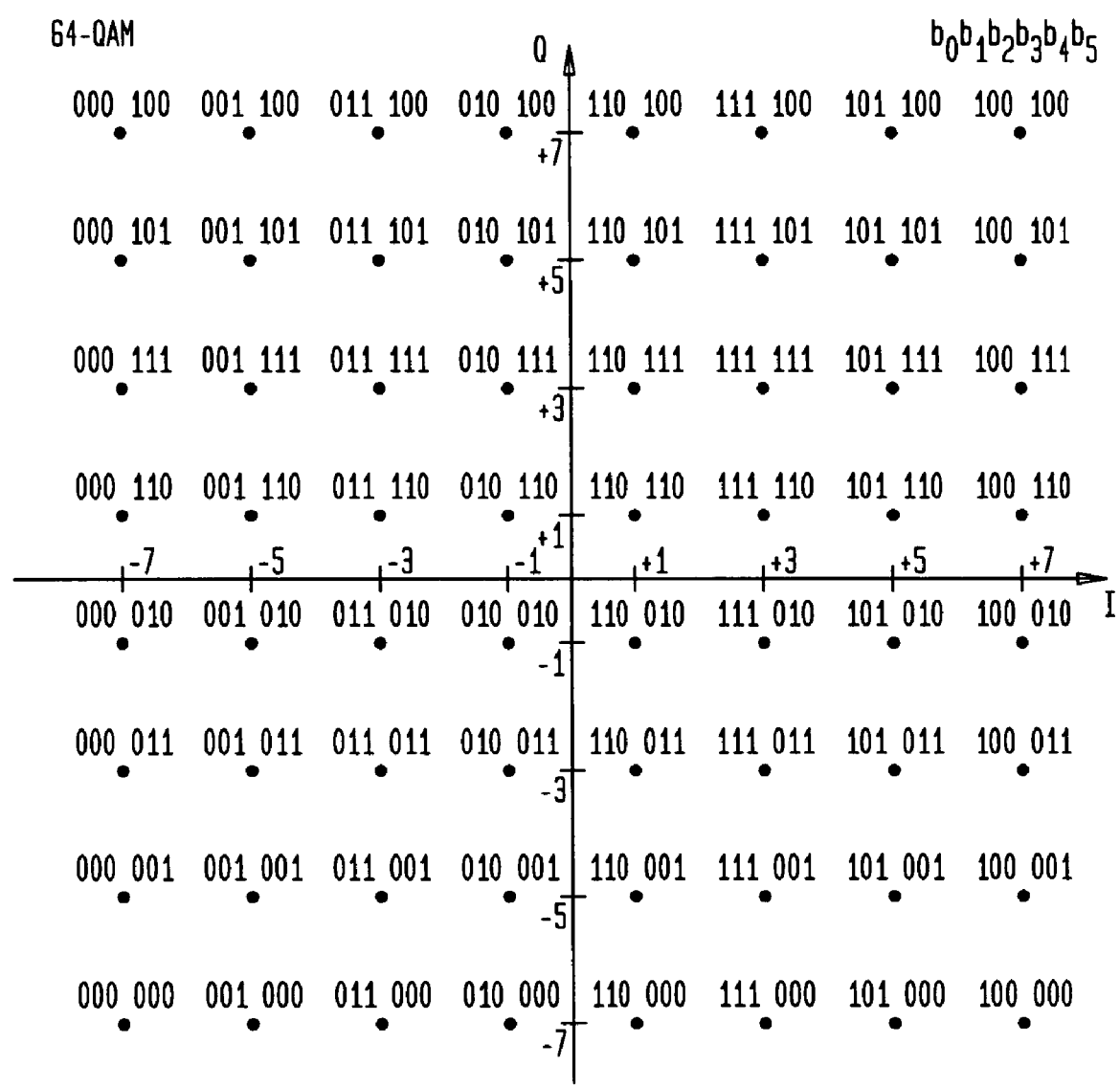
FIG. 2 shows an exemplary 64-QAM encoding constellation as may be processed with the receiver of FIG. 1.

The exemplary embodiment of the present invention is described herein with respect to a MIMO system employing quadrature amplitude modulation (QAM) encoding of data, though the present invention is not so limited. One skilled in the art might extend the teachings herein to other MIMO systems using other forms of encoding of data into transmit symbols. For the exemplary embodiment herein, the MIMO system employs a transmitter with $N_t=2$ transmit antennas, each employing a 64-QAM encoding of data into transmit symbols. FIG. 2 shows an exemplary 64-QAM encoding constellation.

MIMO detector 106 implements a MIMO demapping with soft-output maximum likelihood detection (SO MLD) in accordance with an exemplary embodiment of the present invention. For ease of understanding, the following gives a background of SO MLD for MIMO demapping. MIMO formulation of a log-likelihood approximation for SO MLD generates a soft-bit $L(b_k)$ as follows in equation (1):

$$L(b_k) = \min_{x|b_k=0} \|r - Hx\|^2 - \min_{x|b_k=1} \|r - Hx\|^2 \quad (1)$$

where $L(b_k)$ is the soft-bit for the kth bit, $k=0,1,\ldots,K-1$, coded into the MIMO-QAM symbol. For $N_t=2$ and 64-QAM encoding, K=12, since (2 subcarriers)(6 bits per symbol)=12 bits are decoded per MIMO-OFDM subcarrier. The vector r is an $N_r$-dimensional receive vector, and matrix H is the $(N_r \times N_t)$-dimensional MIMO channel matrix (characterizing the narrowband MIMO transmission wireless channel impulse response or transfer function), which might be estimated by the receiver through decoding of known preamble data. The transmit vector x is the $N_t$-dimensional candidate transmit vector which is a direction function $f(\bullet)$ (e.g., QAM mapping) of the set of all bits $b=\{b_k\}$ modulated into it, as defined by equation (2):

$$x = f(b) = x(b) \quad (2)$$

The receive vector r represents the signal received from the transmission medium that corresponds to the transmit vector $x_{true}$ passed through the channel with transfer function H and corrupted with additive noise n. Thus, the receive vector r is as defined in equation (3):

$$r = Hx_{true} + n \quad (3)$$

where each complex element in the vector $x_{true}$ corresponds to one constellation point of FIG. 1. For the 64-QAM modulation of FIG. 2, Gray coding is employed that specifies that any two adjacent points only differ by one bit. A MIMO demapper evaluating equation (1) for each soft-bit attempts to find candidate vectors x for which the metric (squared Euclidean distance) term y as defined in equation (4):

$$y(x)=y(x(b))=\|r-Hx(b)\|^2. \quad (4)$$

is minimum.

Computation of each term y(x) for the candidate x(b) requires a large number of complex multiplication operations and additions. Consequently, in accordance with embodiments of the present invention, each term y(x) is computed recursively using a doubly-recursive method with a candidate scanning order to reduce the overall number of computations.

Figure 3:
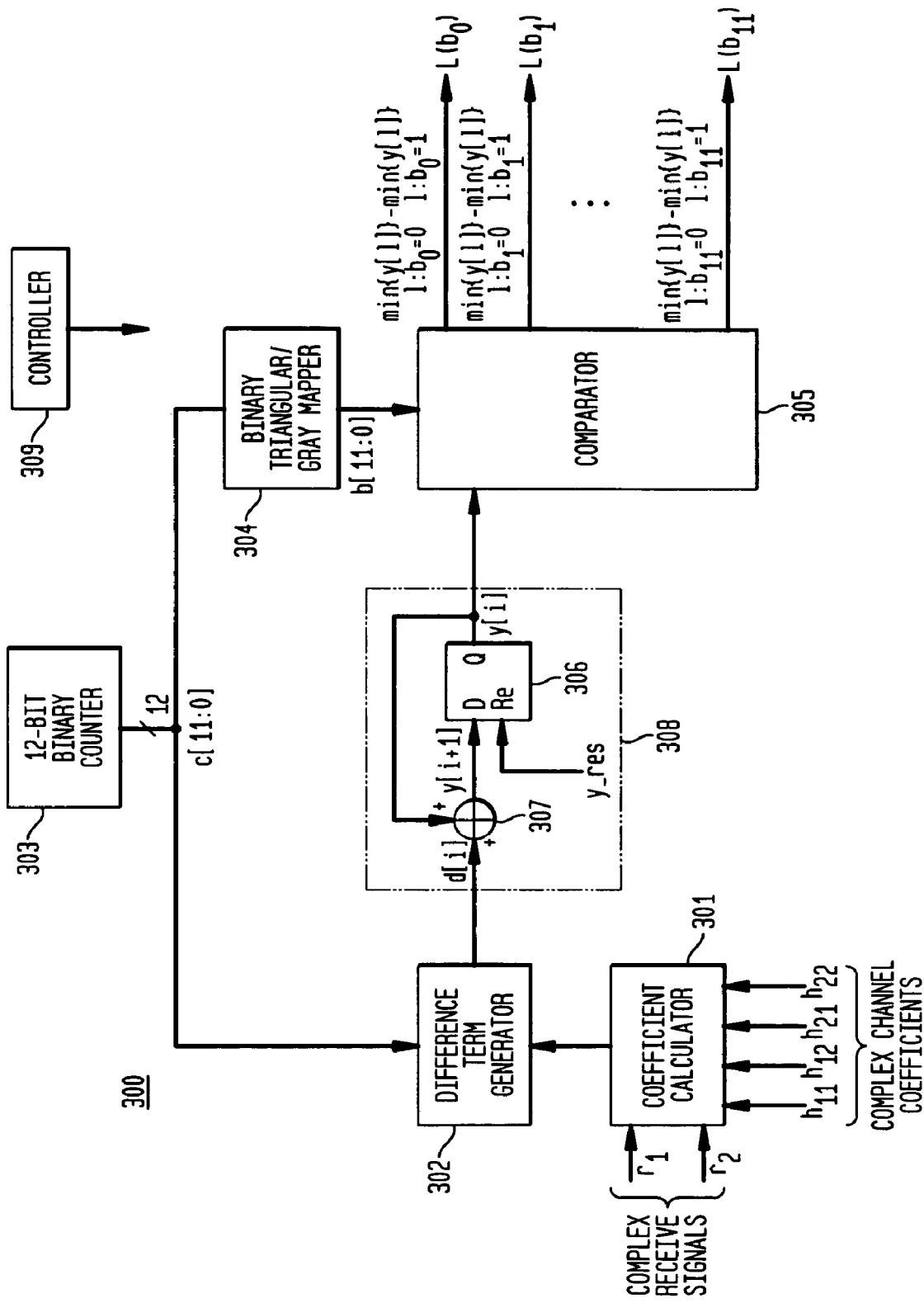
FIG. 3 shows an exemplary implementation for a MIMO demapper as might be employed for the MIMO detector of FIG. 1.

FIG. 3 shows an exemplary implementation for a MIMO demapper as might be employed for MIMO detector 106 of FIG. 1. MIMO demapper 300 comprises coefficient calculator (coeff-calc) 301, difference term generator (DTG) 302, counter 303, mapper 304, comparator unit 305, accumulator 308, and controller 309. Controller 309 might be employed to coordinate processing implemented by the various elements of FIG. 3.

For each clock cycle i, i=0 . . . 4095, one of $64^2=4096$ candidate vectors is evaluated for the exemplary embodiment. Counter 303 is employed to provide the clock cycle to DTG 302 and mapper 304. Counter 303 might be implemented as a 12-bit binary counter for 64-QAM.

Coeff-calc 301 computes various coefficients based on the input signals r and the MIMO channel matrix H, as described subsequently. These coefficients for i) r represent the received signal symbols (in-phase and quadrature phase) components for each receive antenna and ii) the estimated channel impulse response H measured and/or estimated separately by the receiver.

DTG 302 recursively pre-calculates a difference term based on the coefficients generated by coefficient calculator 301, where the difference term corresponds to the metric difference d[i] between two consecutive candidates. DTG 302 recursively pre-calculates the difference term based on the clock cycle i provided as the count value from counter 303. DTG 302 provides the difference term to accumulator 308.

Accumulator 308 generates the Euclidean distance variable y of, for example, equation (4). With y[i] previously generated, y[i+1] is generated by accumulator 308 as y[i+1]=y[i]+d[i]. Accumulator 308 is implemented as register 306 and combiner 307. For each clock cycle i, the difference term d[i] is added, by combiner 307, to the previously calculated value of y in register 306.

In a 2-dimensional QAM-MIMO system, there are four candidate variables (A1, B1, A2, B2): one real component and one imaginary component for each transmit antenna dimension. Following the 64-QAM constellation of FIG. 2, each one of these candidate variables (A1, B1, A2, B2) takes one of the signal alphabet values {−7, −5, −3, −1, 1, 3, 5, 7}. When, in the candidate scanning process, one of these variables is changed in the overall expression for y, the metric y is updated according to this change. This variable change corresponds to selecting one of the difference terms generated by DTG 302, as described subsequently, and forwarding the selected difference term to accumulator 308. With every change of one of the candidate variables, the difference variable itself is updated.

Comparator unit 305, in the course of the whole candidate scan, determines the minimum y values for each of the two possible values (0,1) of each bit, by comparing the current y value for the current value of candidate variables under consideration with the previous minimum of y. At the end of the process, comparator unit 305 provides the differences between these two possible values (0,1) to subsequent processing (not shown in FIG. 3) as the desired SO MLD soft-bits (L($b_k$) values).

Mapper 304 generates values to scan four candidate variables (A1, B1, A2, B2) in a specific order based on the 12-bit binary counter from counter 303. The sequence of counter values (e.g., 12-bit values) from counter 303 are transformed into Gray-coded values following a "triangular waveform" shaped scanning sequence by mapper 304. Starting at its minimum value of −7, each of the four candidate variables (A1, B1, A2, B2) undergoes the triangular waveform scan by comparator 305. For the triangular waveform scan, each successive variable is scanned at a lower rate than the previous variable (e.g., A1 is scanned faster than B1, B1 is scanned faster than A2, and A2 is scanned faster than B2). Thus, whenever a certain variable has reached the top or bottom of the number range (+7 or −7), the next high-level variable is updated before the next upward or downward slope is started.

Figure 4:
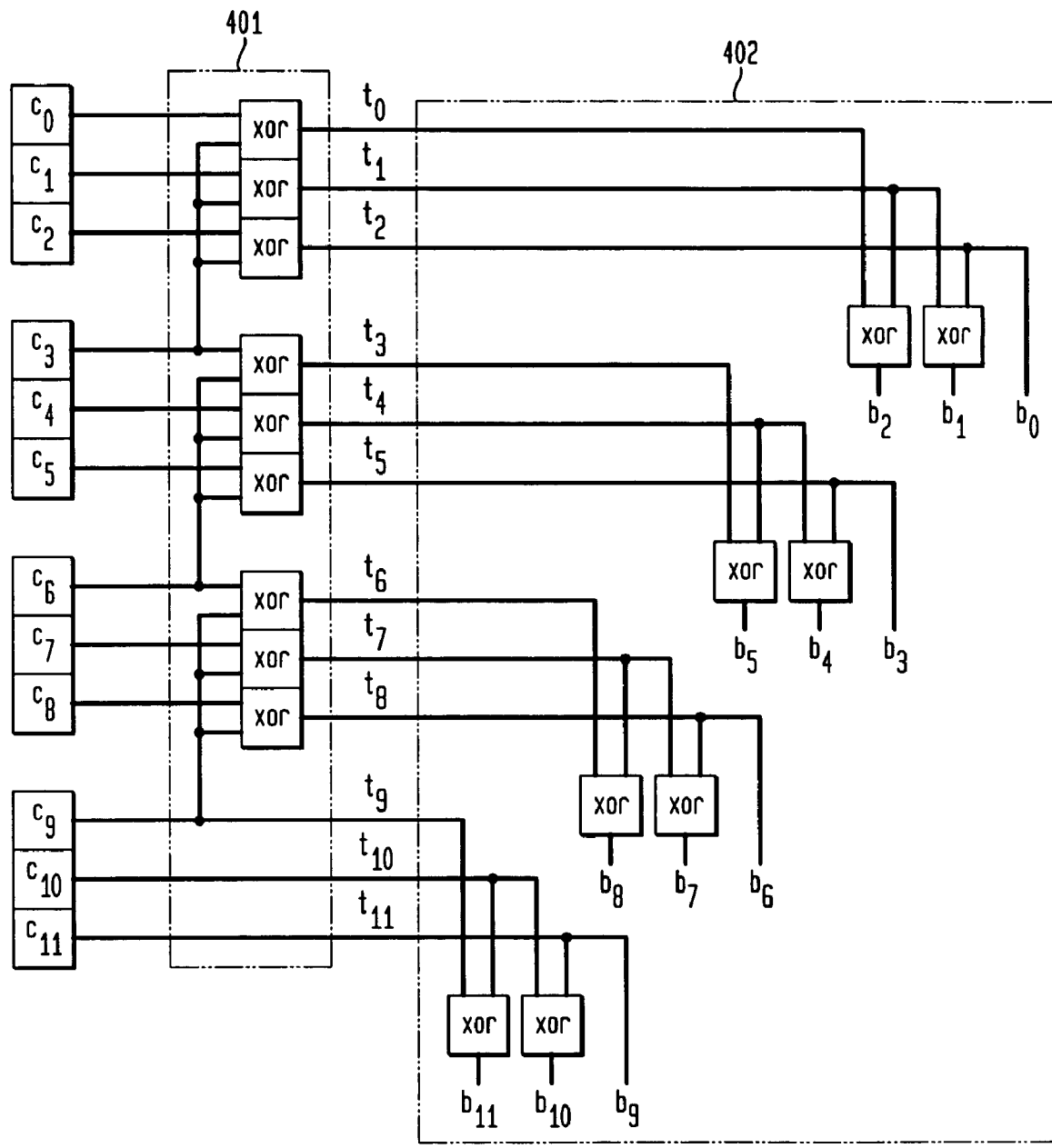
FIG. 4 shows an exemplary implementation for the mapper of FIG. 3.

Operation of the exemplary MIMO demapper of FIG. 3 is now described. FIG. 4 shows an exemplary implementation for mapper 304 of FIG. 3 to generate bit values $b_0$-$b_{11}$ for the candidate variables. Latches $C_0$-$C_{11}$ contain corresponding bit values for the count from counter 303. Elements labeled "XOR" perform an exclusive logic OR on the identified input bits. The triangular waveform scan employs segments of three bits, where each 3-bit segment corresponds to one of the candidate variables (A1, B1, A2, B2). The 3-bit segment counts from 0 to 7 and then from 7 to 0 to point to the various elements of the signal alphabet {−7, −5,−3,−1,1,3,5,7}. For each 3-bit segment from counter 303 (i.e., $C_0$-$C_2$, $C_3$-$C_5$, $C_6$-$C_8$, and $C_9$-$C_{11}$), the up-count is 000, 001, 010, 011, 100, 101, 110, 111, and for the down-count these values are inverted. Up/down counting by 3-bit segments is accomplished via XOR block 401 which XOR's each bit in a 3-bit block with a next higher level bit.

The bit values $t_0$-$t_{11}$ of the up/down count of each 3-bit segment might not necessarily correspond to the bit values $b_1$-$b_{11}$ of the encoded and modulated symbol. For the described Gray-coded QAM symbol signal alphabet {−7, −5,−3,−1,1,3,5,7} as employed in IEEE 802.11g/a OFDM systems, the corresponding binary representation is defined as [000, 100, 110, 010, 011, 111, 101, 001]. Consequently, XOR block 402 is employed to translate the bit values $t_0$-$t_{11}$ of the up/down count into bit values $b_1$-$b_{11}$ of the signal alphabet.

Figure 5:
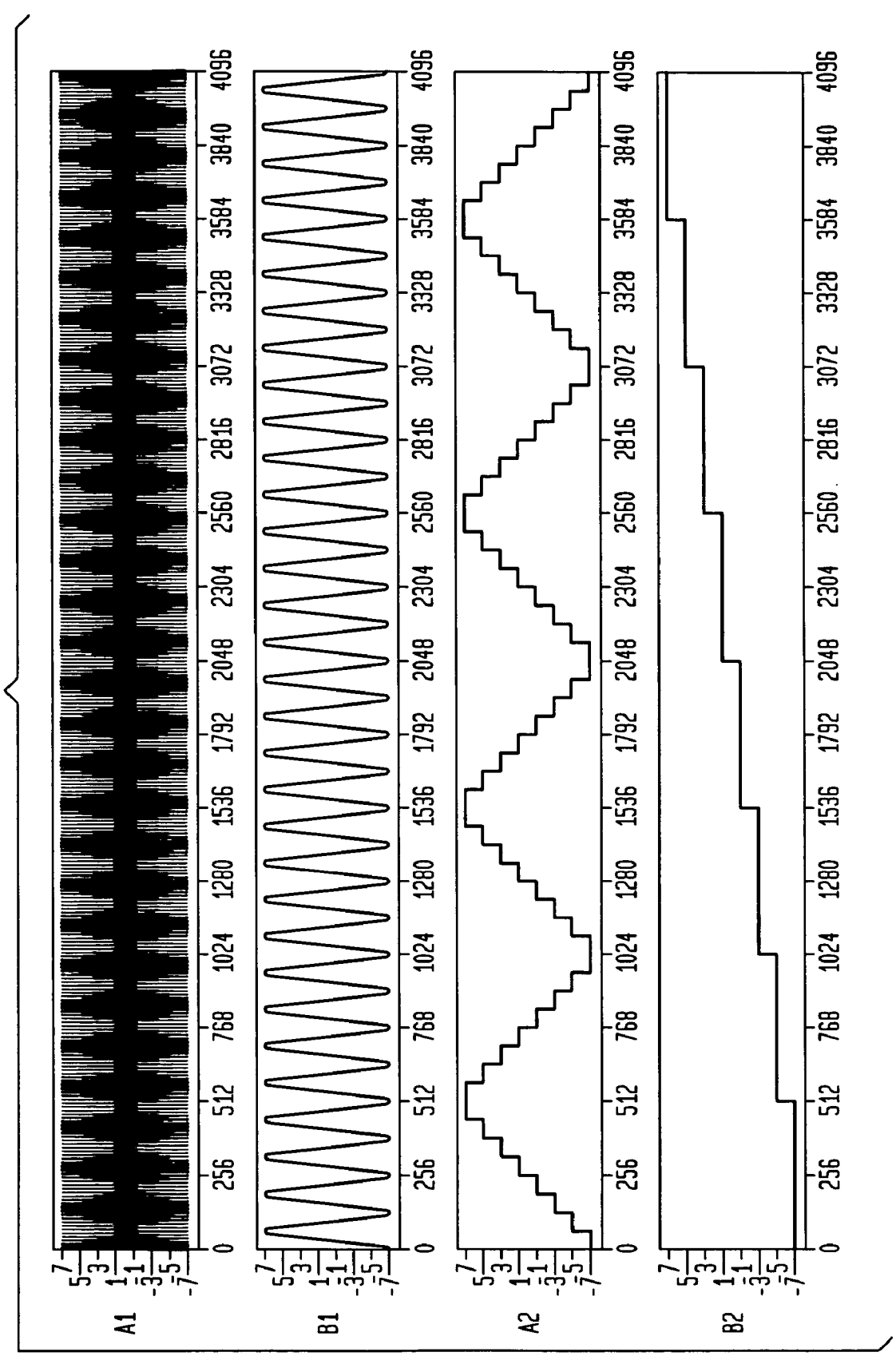
FIG. 5 shows an exemplary candidate variable scan for the exemplary implementation of FIG. 4.

FIG. 5 shows an exemplary candidate variable scan for the exemplary implementation of FIG. 4. As shown in FIG. 5, each of the four candidate variables (A1, B1, A2, B2) undergoes a "triangular waveform" shaped scan by counter 303 and mapper 304, where variable B1 is scanned 8 times more slowly than A1, A2 is scanned 8 times more slowly than B1, and B2 is scanned 8 times more slowly than A2.

Coeff-calc 301 and DTG 302, at any given clock cycle i, provide a difference term to accumulator 308, as described previously, where the difference term corresponds to the metric difference d[i] between two consecutive candidates. Derivation of the coefficients and updating the difference term is now described. The vector-matrix notation of equation (4) is reduced and the result separated into various weights and coefficients. At initialization (i=0), the following variables da1, db1, da2, and db2 are calculated as in equations (5a) through (5d):

$$da1 = \Delta y_{A1} = 2w_1 - 24w_5 - 14w_9 - 14w_{10} \quad (5a)$$

$$db1 = \Delta y_{B1} = 2w_2 - 24w_6 - 14w_{11} - 14w_{12} \quad (5b)$$

$$da2 = \Delta y_{A2} = 2w_3 - 24w_7 - 14w_9 + 14w_{11} \quad (5c)$$

$$db2 = \Delta y_{B2} = 2w_4 - 24w_8 - 14w_{10} - 14w_{12} \quad (5d)$$

The weight coefficients $w_1$ through $w_{12}$ are as given in equations (6), (7), (8), and (9):

$$w_5 = w_6 = (h_{I,11}^2 + h_{Q,11}^2 + h_{I,21}^2 + h_{Q,21}^2) \quad (6)$$

$$w_7 = w_8 = (h_{I,12}^2 + h_{Q,12}^2 + h_{I,22}^2 + h_{Q,22}^2) \quad (7)$$

$$\binom{w_9}{w_{10}} = \binom{w_{12}}{-w_{11}} = \begin{bmatrix} +2h_{I,12} + 2h_{Q,12} + 2h_{I,21} + 2h_{Q,21} \\ -2h_{Q,12} + 2h_{I,12} + 2h_{Q,21} - 2h_{I,21} \end{bmatrix} \cdot \begin{pmatrix} h_{I,11} \\ h_{Q,11} \\ h_{I,22} \\ h_{Q,22} \end{pmatrix} \quad (8)$$

$$\begin{pmatrix} w_1 \\ w_2 \\ w_3 \\ w_4 \end{pmatrix} = \begin{bmatrix} -2h_{I,11} & -2h_{Q,11} & -2h_{I,21} & -2h_{Q,21} \\ +2h_{Q,11} & -2h_{I,11} & +2h_{Q,21} & -2h_{I,21} \\ -2h_{I,12} & -2h_{Q,12} & -2h_{I,22} & -2h_{Q,22} \\ +2h_{Q,12} & -2h_{I,12} & +2h_{Q,22} & -2h_{I,22} \end{bmatrix} \begin{pmatrix} r_{I,1} \\ r_{Q,1} \\ r_{I,2} \\ r_{Q,2} \end{pmatrix} \quad (9)$$

where $h_{(\cdot)}$ are channel impulse response coefficients, $r_{(\cdot)}$ are receive signal coefficients, and subscripts I and Q represent the in-phase and quadrature-phase component values, respectively.

For each clock cycle i, where i=0, . . . , 4095, the update of variables da1, db1, da2, and db2 is given by the following pseudo-code:

```
100   If mod(i + 1, 512) = 0, then       da1 = -da1 + 4w_10
101   elseif mod(i + 8, 512) = 0, then   db1 = -db1 + 4w_12
102   elseif mod(i + 64, 512) = 0, then  da2 = -da2
103   elseif mod(i, 512) = 0, then       db2 = db2 + 8w_8
104   elseif mod(i + 1, 64) = 0, then    da1 = -da1 + 4w_9(-1)^|i/512|
105   elseif mod(i + 8, 64) = 0, then    db1 = -db1 - 4w_11(-1)^|i/64|+|i/512|
106   elseif mod(i, 64) = 0, then        da2 = da2 + 28w_11(-1)^|i/64|+|i/512|
107   elseif mod(i + 1, 8) = 0, then     da1 = -da1
108   elseif mod(i, 8) = 0, then         db1 = db1 + 8w_6
109   else                               da1 = da1 + 8w_5
``` where the function "mod(b,m)" means b modulo m.

Coeff-calc 301 generates values w1 through w12 based on the input vector r and channel impulse response matrix H. To simplify operation, coefficient calculator 301 then computes difference term coefficients e0 through e5. The difference term coefficients e0 through e5 are generated as in equations (10) through (15):

$$e0 = 8w_6 = 8w_5 \quad (10)$$

$$e1 = 4w_{10} = -4w_{11} \quad (11)$$

$$e2 = 4w_{12} = 4w_9 \quad (12)$$

$$e3 = 8w_8 \quad (13)$$

$$e4 = 8w_7 + 28w_{11} \quad (14)$$

$$e5 = 8w_7 - 28w_{11} \quad (15)$$

Figure 6:
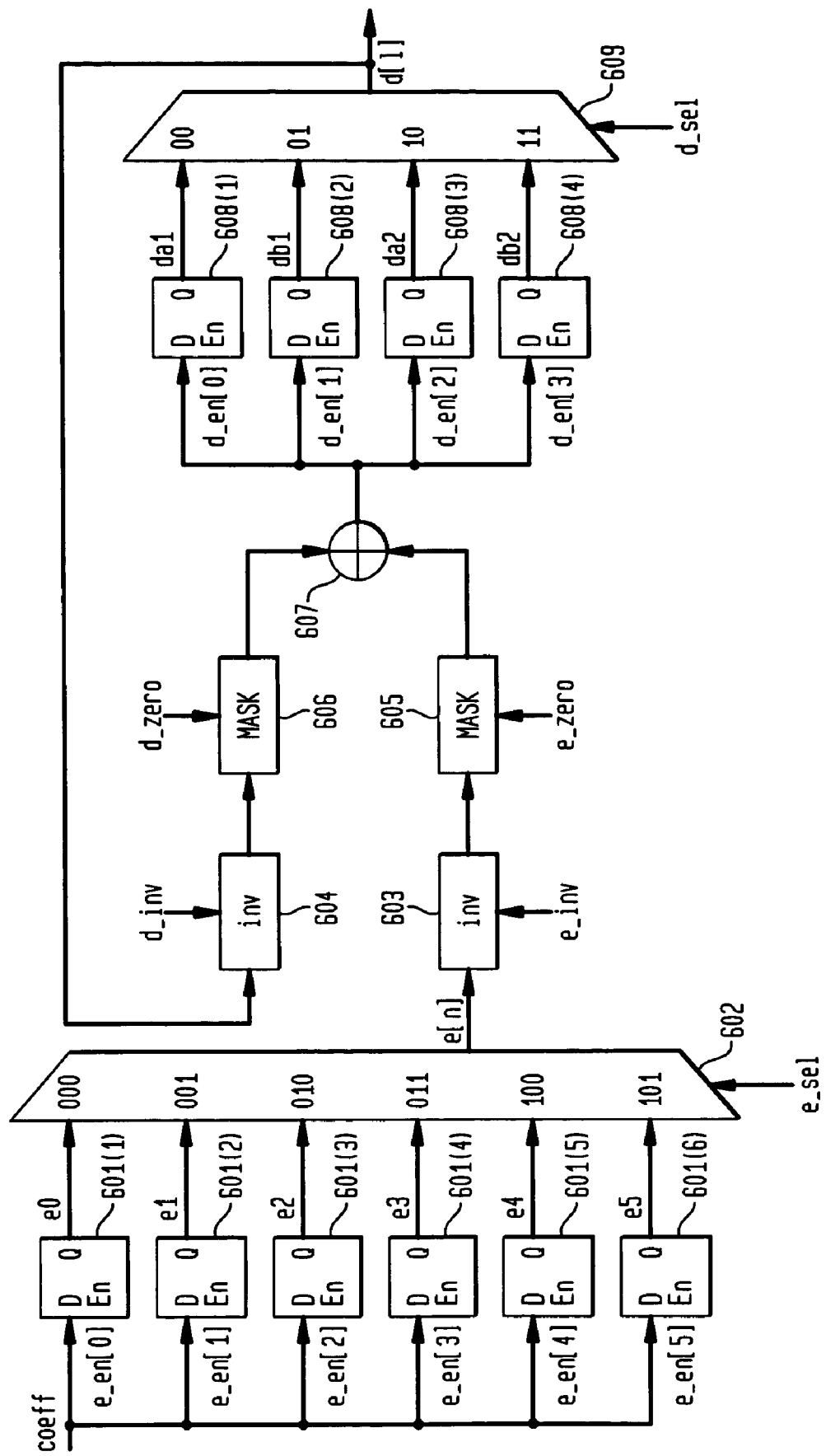
FIG. 6 shows an exemplary implementation for the difference term generator of FIG. 3.

DTG 302 updates the difference da1, db1, da2, and db2 using difference term coefficients e0 through e5 based on a logic implementation for the above pseudo-code. FIG. 6 shows an exemplary logic implementation for DTG 302 of FIG. 3. Latches 601(1) through 601(6) store difference term coefficients e0 through e5, respectively, from coeff-calc 301 (latched in through enable signals e_en[1] through e_en[5]). Mux 602 provides one of difference term coefficients e0 through e5 in accordance with signal e_sel. The various signals of FIG. 6 are generated by a controller (not shown in FIG. 6) implementing the tests of the above pseudo-code.

The signal e_inv is a control signal to invert the input difference term coefficient value of inverter 603, d_inv is a control signal to invert the difference term value of inverter 604, e_zero is a control signal to mask the input difference term coefficient value in mask logic 605, and d_zero is a control signal to mask the difference term value in mask logic 606. The signal d_sel is a signal employed to select, as the output of mux 609, one of the difference terms da1, db1, da2, and db2 stored in latches 608(1) through 608(4), respectively (latched in through enable signals d_en[1] through d_en[3]). The select signal d_sel is generated by a controller (not shown in FIG. 6) implementing the following tests:

$$d[i] = \begin{cases} da1[1], & \text{if } \mod(i+1, 8) \neq 0 \\ db1[i], & \text{if } \mod(i+1, 8) = 0 \text{ and } \mod(i+1, 64) \neq 0 \\ da2[i], & \text{if } \mod(i+1, 64) = 0 \text{ and } \mod(i+1, 512) \neq 0 \\ db2[i], & \text{if } \mod(i+1, 512) = 0 \end{cases}$$

Combiner 607 adds the values generated by mask logic 606 and 605.

Figure 7:
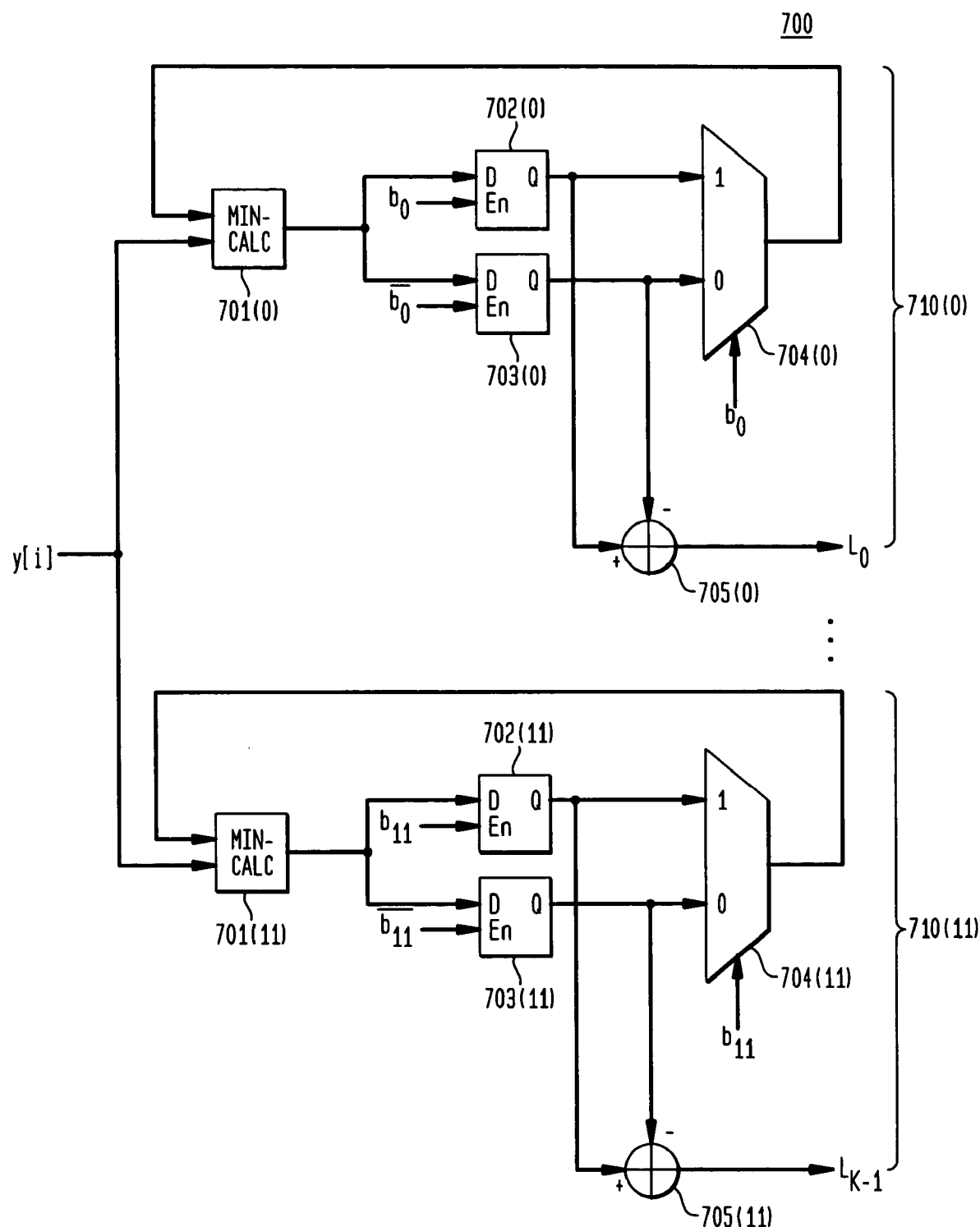
FIG. 7 shows an exemplary implementation for the comparator of FIG. 3.

FIG. 7 shows an exemplary implementation 700 for comparator 305 of FIG. 3 that generates soft-bit values $L_0$ through $L_{11}$ in accordance with equation (1). For y[i], a distance metric is generated for both the corresponding bit being a 1 or a 0, and the minimum value selected. The minimum search is accomplished by storing the current minimum value and comparing the new candidate's Euclidean distance term to this stored minimum value. For each cycle i, twelve soft-bit values $L_0$ through $L_{11}$ are generated by corresponding minima blocks 710(0) through 710(11).

For the kth soft-bit $b_k$, minima block 710(k) comprises minimum calculator (min-calc) block 701(k), flip-flops 702(k) and 703(k), multiplexer (mux) 704(k), and combiner 705(k). Min-calc block 701(k) compares the current value of y[i] with the previous minimum value from mux 704(k), and selects the smaller value. The output of min-calc-block 701(k) is stored in flip-flops 702(k) and 703(k). Flip-flop 702(k) stores the minimum value if $b_k$ is a logic 1 and flip-flop 703(k) stores the minimum value if $b_k$ is a logic 0. The soft-bit value $L(b_k)$ is calculated by combiner 705(k) as the difference between the minimum value if $b_k$ is a logic 1 and the minimum value if $b_k$ is a logic 0.

A multiple-branch wireless receiver operating in accordance with one or more embodiments of the present invention may provide one or more of the following advantages. MIMO mapping employing the SO MLD method described herein reduces the complexity and power consumption of circuits generating candidate transmit vectors, while maintaining a relatively rapid computation and high probability of detection of the receiver.

While certain functions of blocks of the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for detecting a data pattern from a plurality of received signals, the apparatus comprising:
    a mapper providing a sequence of scan values derived from a sequence of count values, each scan value selecting one of a set of candidates in a varying pattern, wherein the mapper generates the sequence of scan values so as to select each of the set of candidates in a periodic scan pattern;
    a difference term generator providing, for each of the sequence of count values, a difference term between a current metric value and a previous metric value based on a set of coefficients for a received symbol;
    an accumulator combining, for each of a sequence of count values, the difference term with one or more previous difference terms to provide one of a set of metric values; and
    a comparator generating, based on the set of metric values corresponding to the sequence of scan values, soft-output values corresponding to the data pattern;
    wherein the received symbol is represented by symbol values in two or more dimensions, and the mapper generates the sequence of scan values so as to select each of the set of candidates in a scan pattern in each dimension, the scan pattern of each dimension varying in frequency with the scan pattern of at least one other dimension.

2. The invention as recited in claim 1, further comprising a coefficient calculator providing the set of coefficients for each received symbol.

3. The invention as recited in claim 2, wherein the coefficients represent the received symbol and channel characteristics.

4. The invention as recited in claim 1, wherein the difference term generator updates the difference term for each count value for the corresponding one of the set of candidates.

5. The invention as recited in claim 1, wherein the metric value for the received symbol is based on an error between the received symbol and one of the set of candidates.

6. The invention as recited in claim 5, wherein the error is Euclidean distance and the metric value is based on an error metric.

7. The invention as recited in claim 5, wherein the error metric is minimum squared Euclidean distance.

8. The invention as recited in claim 1, wherein the comparator generates each soft-output value based on the minimum of the corresponding error metric for the received symbol over the set of candidates.

9. The invention as recited in claim 8, wherein each soft-output value is based on the difference between i) the minimum of the corresponding error metric for the received symbol for the soft-output value being a predefined value and ii) the minimum of the corresponding error metric for the received symbol for the soft-output value being a complement of the predefined value.

10. The invention as recited in claim 1, wherein the periodic scan pattern is triangular-waveform shaped.

11. The invention as recited in claim 1, wherein the apparatus is embodied in an integrated circuit (IC).

12. The invention as recited in claim 11, wherein the IC is embodied in a receiver operating in accordance with an IEEE 802.11 a/b/g standard for orthogonal frequency division multiplex (OFDM) wireless local area networks.

13. The invention as recited in claim 11, wherein the apparatus is embodied for each OFDM subcarrier in the receiver operating in accordance with the IEEE 802.11 a/b/g standard.

14. For a signal processing application, a computer-implemented method of detecting a data pattern from a plurality of received signals, the method comprising the steps of:
    (a) the computer providing a sequence of scan values derived from a sequence of count values, each scan value selecting one of a set of candidates in a varying pattern, wherein step (a) includes the step of generating the sequence of scan values so as to select each of the set of candidates in a periodic scan pattern;
    (b) the computer generating, for each of the sequence of count values, a difference term between a current metric value and a previous metric value based on a set of coefficients for a received symbol;
    (c) the computer combining, for each of a sequence of count values, the difference term with one or more previous difference terms to provide one of a set of metric values; and
    (d) the computer generating, based on the set of metric values corresponding to the sequence of scan values, soft-output values corresponding to the data pattern;
    wherein, for step (a), the received symbol is represented by symbol values in two or more dimensions, and step (a) includes the step of the computer generating the sequence of scan values so as to select each of the set of candidates in a scan pattern in each dimension, the scan pattern of each dimension varying in frequency with the scan pattern of at least one other dimension.

15. The invention as recited in claim 14, further comprising the step of (e) providing the set of coefficients for each received symbol.

16. The invention as recited in claim 15, wherein, for step (e), the coefficients represent the received symbol and channel characteristics.

17. The invention as recited in claim 14, wherein step (b) includes the step of updating the difference term for each count value for the corresponding one of the set of candidates.

18. The invention as recited in claim 14, wherein, for step (b), the metric value for the received symbol is based on an error between the received symbol and one of the set of candidates.

19. The invention as recited in claim 18, wherein, or step (b), the error is Euclidean distance and the metric value is based on an error metric.

20. The invention as recited in claim 18, wherein, for step (b), the error metric is minimum squared Euclidean distance.

21. The invention as recited in claim 14, wherein step (d) includes the step of generating each soft-output value based on the minimum of the corresponding error metric for the received symbol over the set of candidates.

22. The invention as recited in claim 21, wherein, for step (d), each soft-output value is based on the difference between i) the minimum of the corresponding error metric for the received symbol for the soft-output value being a predefined value and ii) the minimum of the corresponding error metric for the received symbol for the soft-output value being a complement of the predefined value.

23. The invention as recited in claim 16, wherein, for step (a), the periodic scan pattern is triangular-waveform shaped.

24. The invention as recited in claim 14, wherein the method is embodied in a processor of an integrated circuit (IC).

25. The invention as recited in claim 24, wherein the method is embodied in the processor of a receiver operating in accordance with an IEEE 802.11 a/b/g standard for orthogonal frequency division multiplex (OFDM) wireless local area networks.

26. The invention as recited in claim 24, wherein the method is embodied for each OFDM subcarrier in the receiver operating in accordance with the IEEE 802.11 a/b/g standard.

27. A computer-readable medium having stored thereon a plurality of instructions, the plurality of instructions including instructions which, when executed by a processor, cause the processor to implement a method for detecting a data pattern from a plurality of received signals, the method comprising the steps of:

(a) providing a sequence of scan values derived from a sequence of count values, each scan value selecting one of a set of candidates in a varying pattern, wherein step (a) includes the step of generating the sequence of scan values so as to select each of the set of candidates in a periodic scan pattern;

(b) generating, for each of the sequence of count values, a difference term between a current metric value and a previous metric value based on a set of coefficients for a received symbol;

(c) combining, for each of a sequence of count values, the difference term with one or more previous difference terms to provide one of a set of metric values; and (d) generating, based on the set of metric values corresponding to the sequence of scan values, soft-output values corresponding to the data pattern;

wherein, for step (a), the received symbol is represented by symbol values in two or more dimensions, and step (a) includes the step of generating the sequence of scan values so as to select each of the set of candidates in a scan pattern in each dimension, the scan pattern of each dimension varying in frequency with the scan pattern of at least one other dimension.

\* \* \* \* \*